United States Patent
Cox et al.

(10) Patent No.: US 12,299,420 B2
(45) Date of Patent: May 13, 2025

(54) AUTOMATION ADJUSTMENT OF SOFTWARE CODE FROM CHANGES IN REPOSITORY

(71) Applicant: Disney Enterprises, Inc., Burbank, CA (US)

(72) Inventors: Jason Alexander Cox, Burbank, CA (US); Steven William Wagner, Burbank, CA (US); Kyle Everett Lanier, Burbank, CA (US); James H. Tatum, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 127 days.

(21) Appl. No.: 18/177,752

(22) Filed: Mar. 2, 2023

(65) Prior Publication Data

US 2024/0296028 A1 Sep. 5, 2024

(51) Int. Cl.
| | |
|---|---|
| *G06F 8/36* | (2018.01) |
| *G06F 8/71* | (2018.01) |
| *G06F 8/77* | (2018.01) |
| *G06F 11/07* | (2006.01) |
| *G06F 11/3604* | (2025.01) |
| *G06N 3/08* | (2023.01) |
| *G06N 20/00* | (2019.01) |

(52) U.S. Cl.
CPC ............ *G06F 8/36* (2013.01); *G06F 8/71* (2013.01); *G06F 8/77* (2013.01); *G06F 11/0793* (2013.01); *G06F 11/3604* (2013.01); *G06N 3/08* (2013.01); *G06N 20/00* (2019.01)

(58) Field of Classification Search
CPC ...... G06F 8/30; G06F 8/36; G06F 8/41; G06F 8/447; G06F 8/72; G06F 8/77; G06N 20/00; G06N 3/08; G06N 3/088; G06N 3/09

See application file for complete search history.

(56) References Cited

U.S. PATENT DOCUMENTS

| | | | |
|---|---|---|---|
| 12,052,285 B1* | 7/2024 | Anjaneyapura Range | G06F 9/5077 |
| 2017/0212829 A1* | 7/2017 | Bales | G06F 11/3604 |
| 2021/0004210 A1* | 1/2021 | Evangelopoulos | G06F 8/33 |
| 2021/0026605 A1* | 1/2021 | Evangelopoulos | G06N 3/084 |
| 2021/0406152 A1* | 12/2021 | Quemy | G06F 11/3624 |
| 2022/0405095 A1* | 12/2022 | Zhang | G06F 8/77 |
| 2023/0028560 A1* | 1/2023 | Chatterjee | G06F 11/3624 |

(Continued)

OTHER PUBLICATIONS

About GitHub Copilot for Individuals, printed from https://docs.github.com/en/copilot/overview-of-github-copilot/about-github-copilot-for-individuals on Mar. 2, 2023, 4 pages.

(Continued)

*Primary Examiner* — Geoffrey R St Leger
(74) *Attorney, Agent, or Firm* — Kwan & Olynick LLP

(57) ABSTRACT

In some embodiments, a method receives a change to data stored in a repository. An artifact that is generated based on the change to the data failed a validation. The method analyzes the change to the data via a model to generate a set of adjustments. The model is trained to output adjustments for the artifact to generate a set of adjusted artifacts. The method determines an adjusted artifact that is associated with an adjustment in the set of adjustments that passes the validation. The adjusted artifact is output as a validated artifact.

19 Claims, 7 Drawing Sheets

(56) References Cited

U.S. PATENT DOCUMENTS

2023/0103989 A1\* 4/2023 Wang ................... G06F 8/433
717/144
2023/0236944 A1\* 7/2023 Hussain ............... G06F 18/214
714/57

OTHER PUBLICATIONS

Jiawei Wu, et al., "Extract and Edit: An Alternative to Back-Translation for Unsupervised Neural Machine Translation," Proceedings of NAACL-HLT 2019, pp. 1173-1183, Jun. 2-Jun. 7, 2019, c 2019 Association for Computational Linguistics.
Manish Sreenivasa, et al., "ModelFactory: A Matlab/Octave Based Toolbox to Create Human Body Models," arXiv:1804.03407v2 [cs.RO] Jul. 13, 2018, 18 pages.
Simone Cammarasana et al., "Spatio-Temporal Analysis and Comparison of 3D Videos," The Visual Computer, Published: Apr. 1, 2022, 16 pages.

\* cited by examiner

AUTOMATION ADJUSTMENT OF SOFTWARE CODE FROM CHANGES IN REPOSITORY

BACKGROUND

When developing software code, a user submits changes to the software code to a source code repository. A system processes those changes and produces an artifact. The artifact may be executables, libraries, and/or a byproduct that is produced by the change to the software code. When the user attempts to use or execute the artifact, the artifact may not work. For example, if a character is being animated, the animated character produced by the artifact may not move properly or as the user may desire. The user must then make changes to the software code and re-submit those changes to the source code repository. The process continues until the user can determine a working artifact is produced.

The above manual loop requires a large amount of user time. However, the errors that may have occurred may often be the result of similar simple mistakes that many users have made. However, each user may be required to manually inspect the code and make changes to correct the errors individually. Also, the changes may not be an optimal change or the best solution, and determining the changes may take an undesirably long time to figure out.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
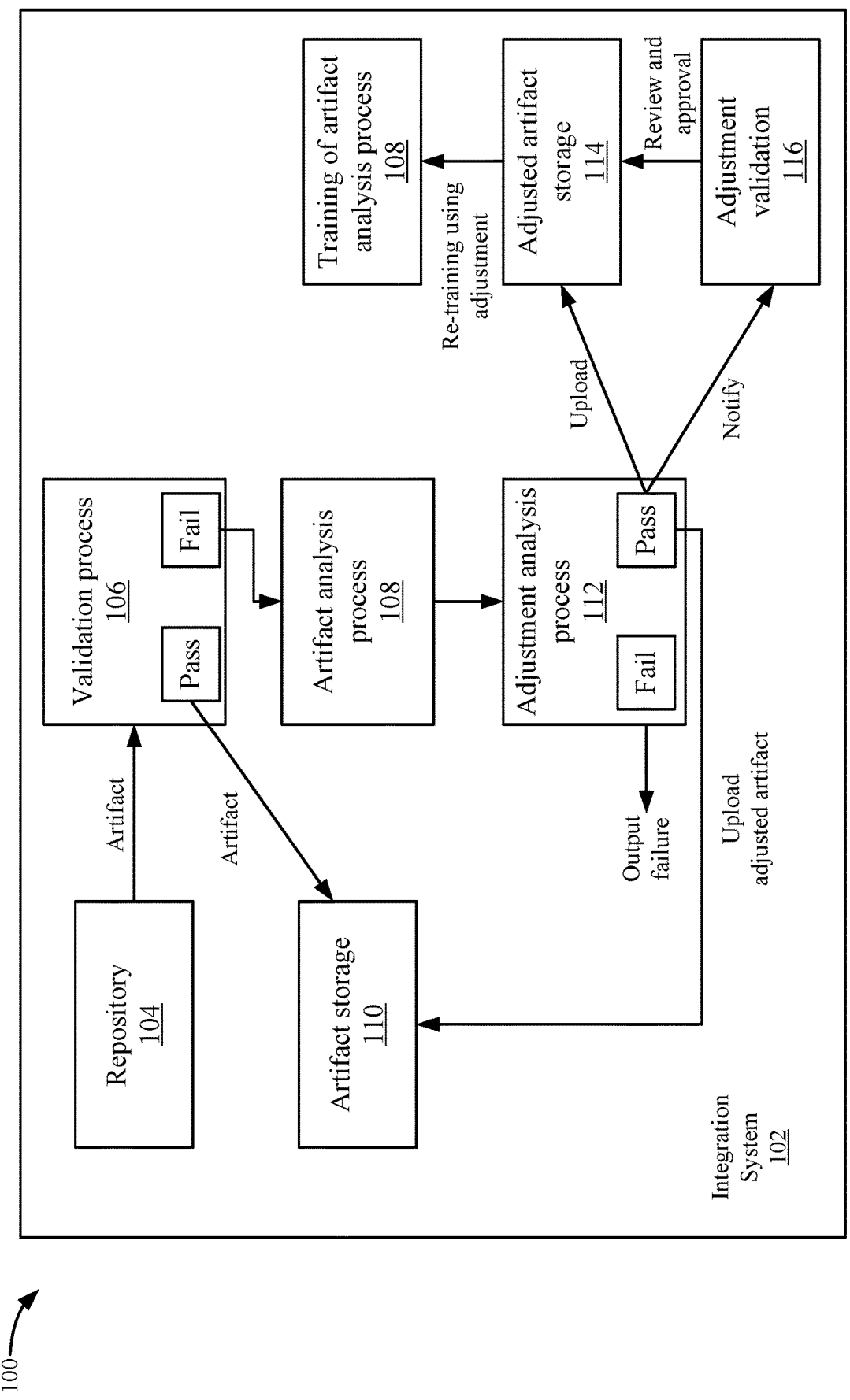
FIG. 1 depicts a simplified system for determining adjustments to data according to some embodiments.

Described herein are techniques for an automatic data adjustment and validation system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

Overview

A system is configured to identify and correct files in a repository to automatically produce a validated artifact. An artifact may be an entity that is produced based on files found in the repository. For example, an artifact may be executables, libraries, or other byproducts that are produced from files submitted to the repository.

In some embodiments, a system is trained to learn adjustments that can be made to the files that are uploaded to the repository. For example, the system may use a machine learning system to learn adjustments that can be made, such as previously made adjustments based on previous submissions via users. When a file is submitted by a user to the repository, a validation process may analyze an artifact that is generated from the file. The validation process may determine whether the artifact meets a threshold, such as fails or passes. If the artifact fails the validation, an adjustment analysis process may analyze information based on the file, such as the changes to the file, and generate a list of possible adjustments. As will be discussed below, the adjustment analysis process may use a machine learning model to generate adjustments. The adjustments may be based on adjustments that are learned by the machine learning process based on previous corrections that produced valid artifacts. Additionally, the adjustment analysis process may output confidence levels for each adjustment, which rate a confidence that the adjustment may correct the failed validation.

The adjustment analysis process may test the adjustments to determine if respective adjustments produce an artifact that passes validation. If no viable artifact is generated by an adjustment, the system may output a notification of a failure, and a user may manually adjust the file. If an adjustment produces a valid artifact, the system may store the artifact in a location for artifacts with metadata based on the adjustment that was made by the machine learning process. Accordingly, the adjustment analysis process automatically determines an adjustment that generates an artifact that passes validation, which saves manual user time to determine an adjustment to a file that failed validation. Also, the adjustment analysis process may select an adjustment that has the highest confidence level that passes validation, which may improve the artifact that is generated because of a higher quality adjustment based on the confidence value being ranked the highest.

The system may also re-train the adjustment analysis process using the failures and the successful adjustments. This may improve the adjustment analysis process over time and may also reduce the number of manual interventions that are required over time.

The above process may be used in different areas. Some examples may be used in software development. Although the process is described with respect to software development, the process may be used in other areas as will be described below. In some examples, source code files may be submitted to a source code repository. A build of the source code is performed, which is the process of converting source code files into software artifact(s) that can be executed on a computer. Iterative builds, which may be referred to as continuous integration, are where application components are collected and repeatedly compiled for testing purposes to ensure a reliable final product. In some examples, the system may validate modeling or design of content, such as animatronic kinematics. For example, the validation may require motion simulations to pass thresholds, such as behave correctly. In some examples, a user may be developing software code for an animated character. The user may submit a file with an addition or change to values that control the movement of the character. Then, an artifact is generated from the submission. For example, the artifact may produce information that is used to generate an animation of the character. A validation process may validate that the animated character moves in a desired fashion. For example, the validation process may test whether the movement meets some thresholds or violates some thresholds. If the animated character fails the validation, the adjustment analysis process may analyze the file and determine adjustments along with confidence values. The adjustment analysis process may analyze the adjustment to select an adjustment that produces an artifact that passes validation. For example, the adjustment analysis process may generate the artifacts from the adjustments and validate whether the animated character's movement produced from the artifacts passes the validation. In some embodiments, the adjustment analysis process may select a highest ranked adjustment per the confidence values that passes validation. If an adjustment passes, the adjustment analysis process may store the artifact in the artifact storage. Accordingly, through a combination of supervised and unsupervised learning, the user did not have to manually determine the adjustment that was needed to produce an animated character that behaves correctly. The above process may not have been able to be performed in the mind of a user because the model is trained to output adjustments in real-time. A manual adjustment may take many hours to determine if any could be determined.

The validation process may also be used in other areas. For example, for three-dimensional (3D) animations, the adjustment may propose changes to the object attributes in a scene. The validation may compare the output against a known good image to determine if the object looks correct. Also, the validation could perform visual recognition for a desired object to determine whether an image is recognizable. For general software engineering, a validation may determine whether functions are communicating data correctly. For example, a function A may output a type Y that is used by another function B expecting an output of type Z. The validation could run a model to verify the expected behavior of the outputs and inputs. The system may then generate adjustments for the functions such that the functions may behave properly. Also, the system may validate the legibility of an electronic book. For example, an electronic book may be published and a user may want to check if the generated electronic publication is legible. The system may generate adjustments for text of the electronic book. Also, an advertising system's proposed advertisement schedule could also be validated using this system. For example, a business unit may not want to run certain combinations of advertisements together, or run the same advertisements back-to-back. The system may propose adjustments that abide by these rules. Accordingly, the system may be used not just to validate source code and determine adjustments, but also for any data that is being submitted.

System Overview

FIG. 1 depicts a simplified system 100 for determining adjustments to data according to some embodiments. System 100 includes an integration system, which may manage a process, such as a software development process. Integration system 102 may be a continuous integration (CI) system that manages a build pipeline of developing software. Although integration system 102 is described within a build pipeline, the process may be used for any validations of data as discussed above. For discussion purposes, the validation of software code may be used, but other validations of data may be appreciated.

A repository 104 may store files, which may be submitted by a user. The files may include source code, but may include other types of data that can be used to generate artifacts. In some embodiments, repository 104 may be a source code repository that manages source code that is submitted by users. For example, a file may be received with software code that may change some pre-existing software code stored in repository 104. A change to a file may be a change to a file that has been previously used to generate an artifact. Also, the file may be a new file that is being added to repository 104. A new file may be one that generates a new artifact.

An artifact may require review and validation. Accordingly, when a file is received that requires validation, a validation process 106 is executed. Validation process 106 receives a generated artifact and is configured to run a validation process to determine whether the artifact passes or fails the validation, such as meets a threshold. Validation process 106 may replace manual review and manual validation by a user.

Validation process 106 may perform different validations. For example, validation process 106 may compare the artifact to thresholds to determine whether or not the artifact meets the threshold, such as passes or fails the validation. Also, validation process 106 may use a machine learning process that receives input information for the artifact to determine whether or not the artifact is validated (e.g., passes or fails). The validation may be different based on the file that is submitted. The validation may validate that the artifact operates as desired. As mentioned above, if animatronic kinematics is being used, validation requires motion simulations to pass a certain threshold, such as movement distances. Also, for an electronic book, the text may need to be legible. If the artifact passes, validation process 106 may store the artifact in an artifact storage 110. Artifact storage 110 is configured to store validated artifacts, which may be from adjustments as described below or from submitted files that pass validation.

If the artifact fails the validation, an artifact analysis process 108 is performed. Artifact analysis process 108 receives the file that was submitted to repository 104. Then, artifact analysis process 108 may generate adjustments for the generated artifact. As will be described in more detail below, artifact analysis process 108 may use different methods, such as a machine learning model, to generate the recommended adjustments. Artifact analysis process 108 may also generate a confidence value for each adjustment. The confidence values may rank adjustments against each other. For example, a confidence value may rate a respective adjustment based on the likelihood of the adjustment passing a validation.

Artifact analysis process 108 may send the adjustments and confidence values to an adjustment analysis process 112. Adjustment analysis process 112 may then analyze the adjustments to validate at least one of the adjustments. For example, adjustment analysis process 112 may generate artifacts from the adjustments and determine whether the artifacts meet a threshold. The validation may be similar to the validation performed by validation process 106, such as the adjustment validation process may use similar thresholds. If all of the adjustments fail, adjustment analysis process 112 may output a failure, and a user may have to manually determine an adjustment. However, adjustment analysis process 112 may determine that at least one of the adjustments passes the validation. As will be discussed in more detail below with respect to FIG. 3, an adjustment analysis process 112 may output a highest ranked adjustment per the confidence values that passes validation.

If an adjustment passes the validation, adjustment analysis process 112 upload the adjusted artifact to artifact storage 110. The artifacts may also be tagged with additional metadata denoting their source, such as via the machine learning model. Then, additional adjustments may be made as needed. Also, adjustment analysis process 112 may output a notification that an adjustment passed.

Additionally, adjustment analysis process 112 may upload the artifact to an adjusted artifact storage 114. Adjusted artifact storage 114 may store the adjustments to artifacts for training purposes. For example, a user may verify the adjustment or alternatively, a system may automatically verify the adjustment. An adjustment validation 116 may receive approval from a user or automatic process that the adjustment is validated and then the adjusted artifact is used to retrain artifact analysis process 108. For example, the original artifact, the adjusted artifact, and the change made may be used to train the machine learning model to recognize and recommend an adjustment when a similar artifact is received in the future.

The following will now describe the artifact analysis and then the adjustment analysis in more detail.

Artifact Analysis

Figure 2:
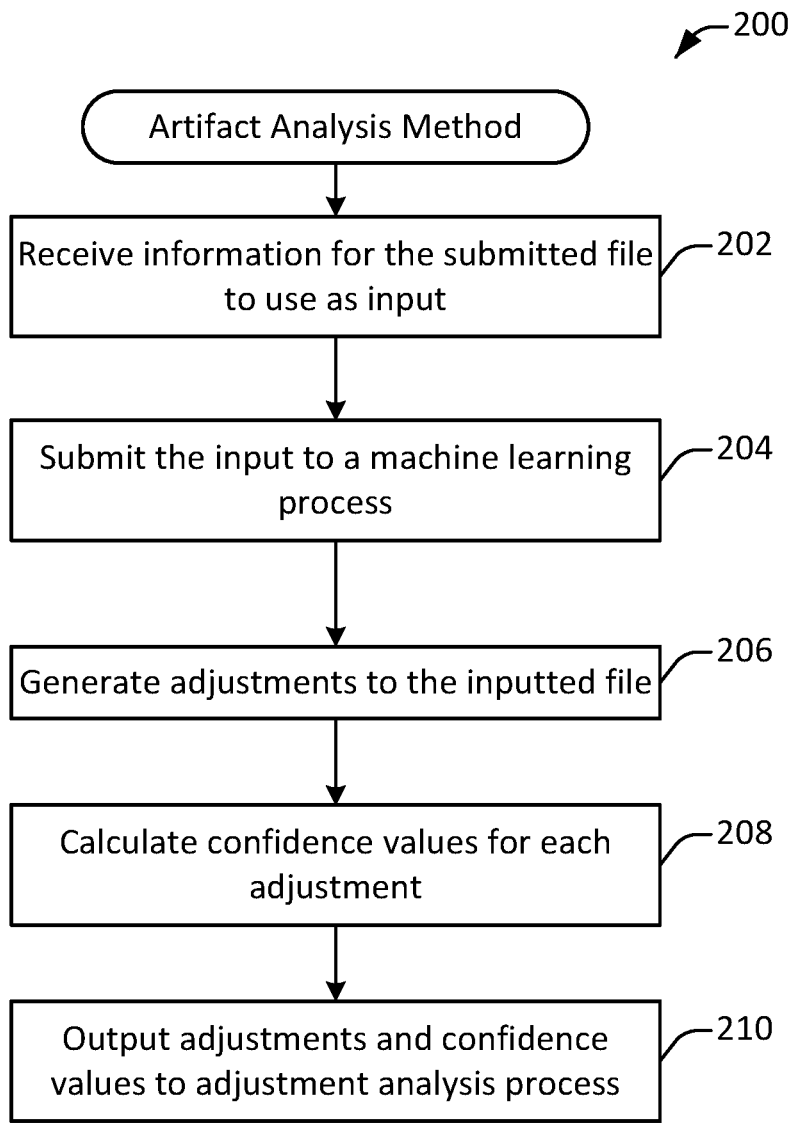
FIG. 2 depicts a simplified flowchart of a method for determining adjustments for an artifact according to some embodiments.

FIG. 2 depicts a simplified flowchart 200 of a method for determining adjustments for an artifact according to some embodiments. At 202, artifact analysis process 108 receives information for the submitted file to use as input. For example, the information may be an original state and the changes made to the original state by the file. The original state may be file types, settings, values, parameters, etc. that were included in an original file in repository 104. The changes may be a file difference between the submitted file and the original file, and may include changes in settings, values, parameters, etc. A file may be a portion of data in repository 104. Other information may also be included in the input, such as the file that was uploaded to repository 104, the artifact that is generated due to the change, an original artifact that was generated by the original file, etc.

At 204, artifact analysis process 108 submits the input to a machine learning process. The machine learning process may use one or more machine learning models that have been trained to recommend adjustments for the generated artifact. In some examples, a prediction network or multiple prediction networks may implement the machine learning models. The machine learning models may include parameters that are trained to generate adjustments based on previously encountered adjustments that resulted in validated artifacts. Different examples of the machine learning model and training the machine learning model will be described in FIGS. 3, 4, 5, and 6.

At 206, artifact analysis process 108 generates adjustments to the file that was submitted to repository 104. Adjustments to the submitted file may be based on the software code found in the file. For example, in animatronic kinematics, an adjustment may be to sets of numerical values in the software code that change how a character moves. Also, the adjustments may propose changes to object attributes in a scene for animation, where the attributes may be used to generate the scene. Another adjustment may be an adjustment to a function or an adjustment in text font in an electronic book.

At 208, artifact analysis process 108 calculates confidence values for each adjustment. The confidence values may be generated using different methods. For example, during training, the machine learning model may learn which adjustments may be made with the highest validation rate. The higher validation rates may result in higher confidence values. Also, confidence values may be based on accuracy values by comparing the predictions to actual results during training. Further, the confidence values may be based on probability by calculating the likelihood of a prediction being correct. Other methods may also be appreciated.

At 210, artifact analysis process 108 outputs the adjustments and confidence values to adjustment analysis process 112. Adjustment analysis process 112 analyzes the adjustments, which will be described in more detail now.

Adjustments Analysis

Figure 3:
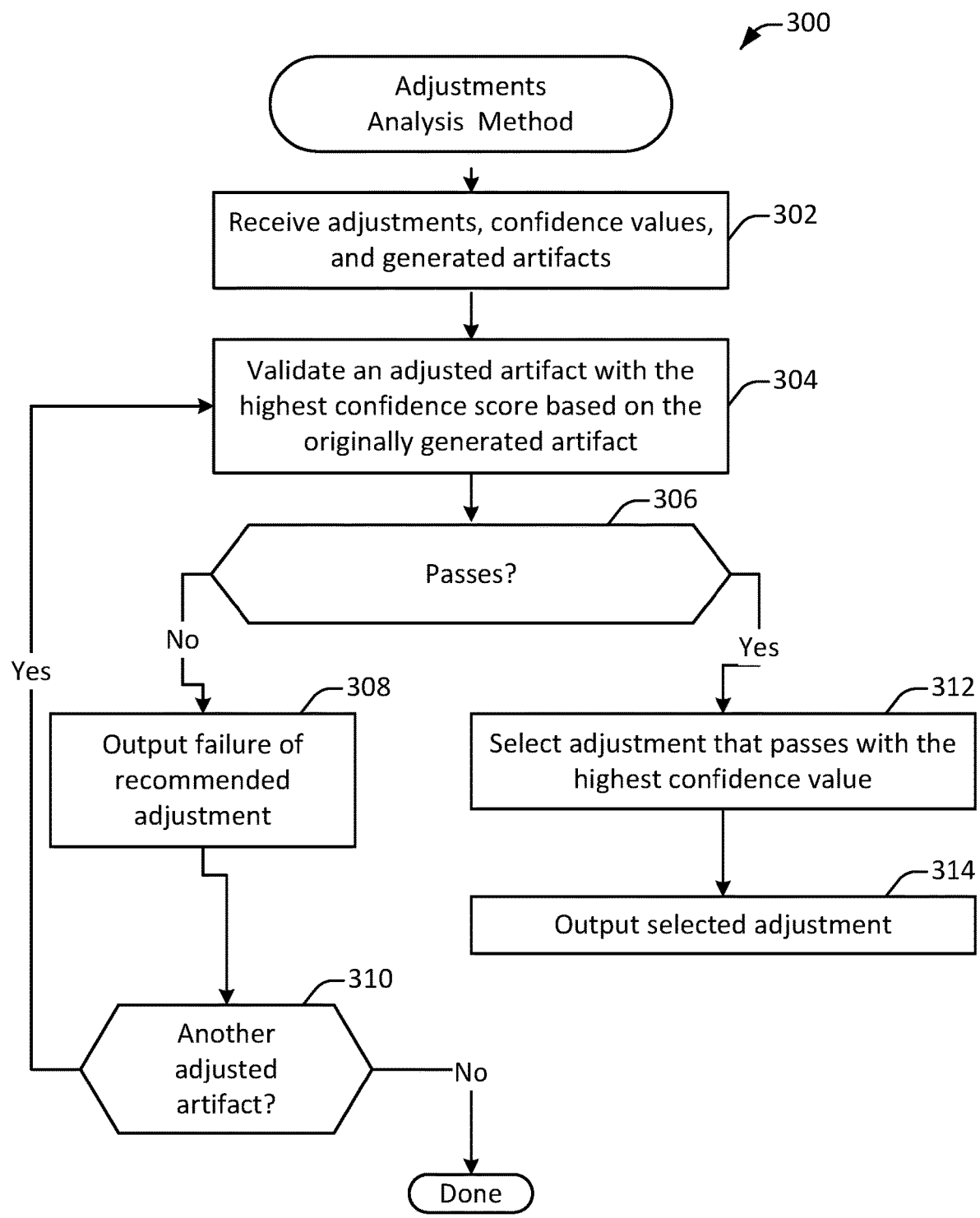
FIG. 3 depicts a simplified flowchart of a method for analyzing adjustments for an artifact according to some embodiments.

FIG. 3 depicts a simplified flowchart 300 of a method for analyzing adjustments for an artifact according to some embodiments. At 302, adjustment analysis process 112 receives the adjustments and respective confidence values. Also, adjustment analysis process 112 or another process may generate artifacts from the adjustments. For example, the adjusted values in the adjustments may be used to generate adjusted artifacts.

At 304, adjustment analysis process 112 validates an adjusted artifact with the highest confidence value based on the original generated artifact. In the following process, adjustment analysis process 112 may analyze adjusted artifacts from a highest confidence value to a lowest confidence value. This may determine the highest ranked adjustment that passes validation. However, other processes may be appreciated. For example, a portion or all adjusted artifacts may be analyzed in parallel to determine which adjusted artifacts are validated.

At 306, adjustment analysis process 112 determines if the validation passes. For example, the adjusted artifact may be validated based on the same validations that are performed in validation process 106 for the originally generated artifact. That is, the adjusted artifact may be compared to the same thresholds or tolerances. In other examples, the adjusted artifact may be compared to the originally generated artifact to determine if the changes improve the originally generated artifact. The adjusted artifact may even be flagged for review by a user. Other validation processes may also be appreciated.

At 308, if the adjusted artifact does not pass validation, adjustment analysis process 112 outputs a failure of the recommended adjustment. The output may cause another adjusted artifact to be analyzed. At 310, adjustment analysis process 112 determines if there is another adjusted artifact to analyze. If so, the process reiterates to 304 to test another adjusted artifact, such as an adjusted artifact with the next highest confidence value. If there is not another adjusted artifact, the process ends. In this case, there may not be any adjusted artifacts that pass validation. Adjustment analysis process 112 may then output a message to a user that all adjustments have failed, and a manual adjustment may need to be made.

At 312, if the adjusted artifact passes the validation, adjustment analysis process 112 selects the adjustment. For example, this adjustment would be the adjustment that has passed with the highest confidence value. In other examples, if adjusted artifacts were validated in parallel, this process may select an adjustment that had the highest confidence value that was validated.

At 314, adjustment analysis process 112 outputs the selected adjustment. As described above in FIG. 1, the selected adjustment may be provided to an adjustment validation 116 and also the adjusted artifact may be stored in artifact storage 110 and adjusted artifact storage 114. Although one adjustment is selected, multiple adjustments that pass validation may be output. The multiple adjustments may be further reviewed, such as by a user, to determine which adjustment to use. Also, the multiple adjustments may be used to retrain the machine learning models.

Machine Learning Model

Figure 4:
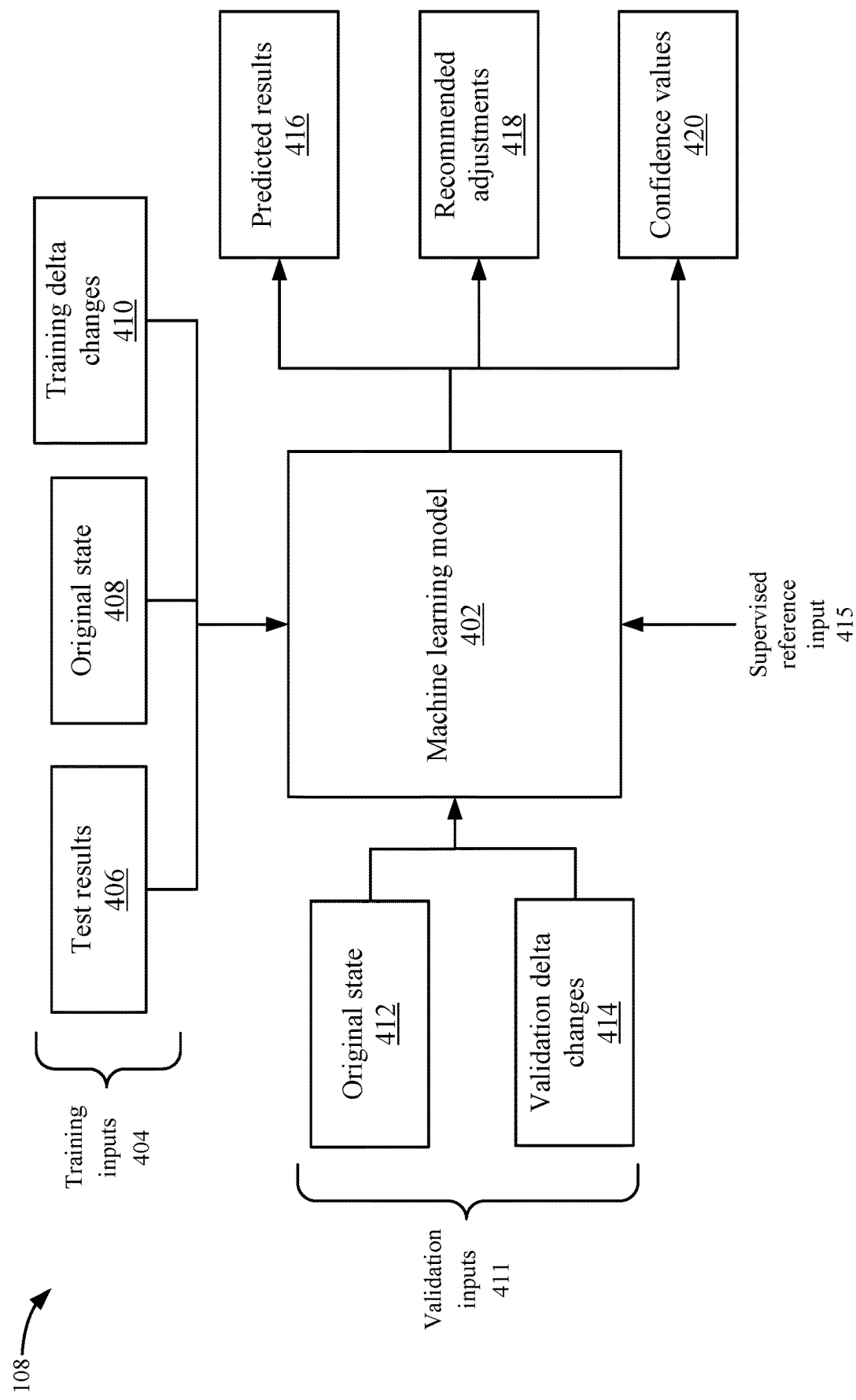
FIG. 4 depicts a more detailed example of an artifact analysis process according to some embodiments.

The generation of adjustments may be performed using a machine learning model. FIG. 4 depicts a more detailed example of artifact analysis process 108 according to some embodiments. A machine learning model 402 may be used to generate the adjustments. Machine learning model 402 may include parameters that can be adjusted based on training of the model. In some embodiments, a prediction network, such as a neural network, may implement the model. Also, multiple models and multiple networks may be used.

Machine learning model 402 may be trained using different methods. As will be described below in FIGS. 5 and 6, supervised and unsupervised training methods may be used. Training inputs 404 may be used to train machine learning model 402. Different training inputs may be appreciated. In some examples, test results 406, an original state 408, and training delta changes 410 may be input into machine learning model 402. Test results 406 may include an execution state. For example, the execution state may be information from the execution of the artifact, such as the artifact operating outside a nominal target, or any other results from the validation. Original state 408 may include file types, settings, values, parameters, etc. from an original file in repository 104. Training delta changes 410 may be changes based on the file submitted to repository 104 compared to the original file. For example, delta changes may include a file diff operation (e.g., an operation that analyzes differences between files) based on the submitted file compared to the previously stored original file. The changes may be the change in settings, the change in values, the change in parameters of the original state. etc. Also, if supervised training is being performed, supervised reference input 415 may also be used. The supervised reference input may be a labeled dataset, where the correct outputs are provided for each example in the training inputs 404.

Machine learning model 402 may process the training inputs and generate a predicted result 416, recommended adjustments 418, and confidence values 420. Depending on the type of training that is performed, the outputs of machine learning model 402 may be used to adjust parameters of machine learning model 402. The training will be described in more detail with respect to FIGS. 5 and 6.

Once machine learning model 402 is trained, machine learning model 402 may be used to determine adjustments to a generated artifact that fails the validation process. Validation inputs 411 may include an original state 412 and validation delta changes 414. Original state 412 may be file types, settings, values, parameters, etc. of the original file before the changes were made. Validation delta changes 414 may be a file diff between the submitted file and the original file, such as changes in settings, values parameters, etc. between the submitted file and the original file.

Machine learning model 402 processes the inputs and is configured to generate output for an adjustment, such as predicted results 416, recommended adjustments 418, and confidence values 420. Machine learning model 402 may process original state 412 and validation delta changes 414 to determine adjustments to the generated artifact. For example, machine learning model 402 may be trained to detect similar adjustments that were previously made that resulted in validated artifacts. The adjustments may be similar in value to the delta changes, but may be slightly different. For example, machine learning model 402 may slightly adjust values in the original file to create an artifact that moves slightly differently. Recommended adjustments 418 may be a file diff between the original file and the adjustments, such as changes in settings, values, and parameters, etc. Machine learning model 402 then ranks the adjustments using confidence values. Confidence values 420 may rate the likelihood of the adjustment passing the validation. Confidence values 420 may be generated differently. In some examples, the similarity of the changes to prior solutions may be used to determine the confidence that the adjustment may pass validation. The higher similarity between the adjustment to a prior solution that was validated may result in a higher confidence value, whereas a lower similarity may result in a lower confidence value.

The predicted results 416 may output a pass or a fail, or a probability of passing or failing. This may indicate whether or not machine learning model 402 predicts the recommended adjustment will pass or fail the validation. The training process may use the predicted results to provide feedback signals that may take a lot of discrete iterations before a confidence value begins to increase. In other words, the training process recommends an adjustment at 418 for achieving some discrete improvement as a predicted result at 416. In the case where the predicted result is achieved and the confidence value at 420 has not improved, the training process can still apply a reward for achieving the intended discrete prediction. In some embodiments, the training process of generating finely adjusted motion improvements to a dancing animatronic character, where many of these discrete adjustments added over time may start to eventually increase the confidence value that a model is progressing towards the desired end state. Based on the predicted result feedback signal, the training process can update the parameters of model 402 to optimize its behavior, resulting in improved predictions. This iterative process allows the model 402 to learn from its experiences, thereby becoming more skilled at maximizing a reward signal over time, eventually leading to progressive confidence values and convergence towards the desired recommended adjustments. Also, the training process may compare the recommended adjustments to the supervised reference input to determine any differences. The training process may adjust parameters of model 402 based on the differences to adjust the model to generate predictions to minimize the differences.

As mentioned above, different training processes may be used. The following will describe a supervised training method and an unsupervised training method.

Supervised Training

Figure 5:
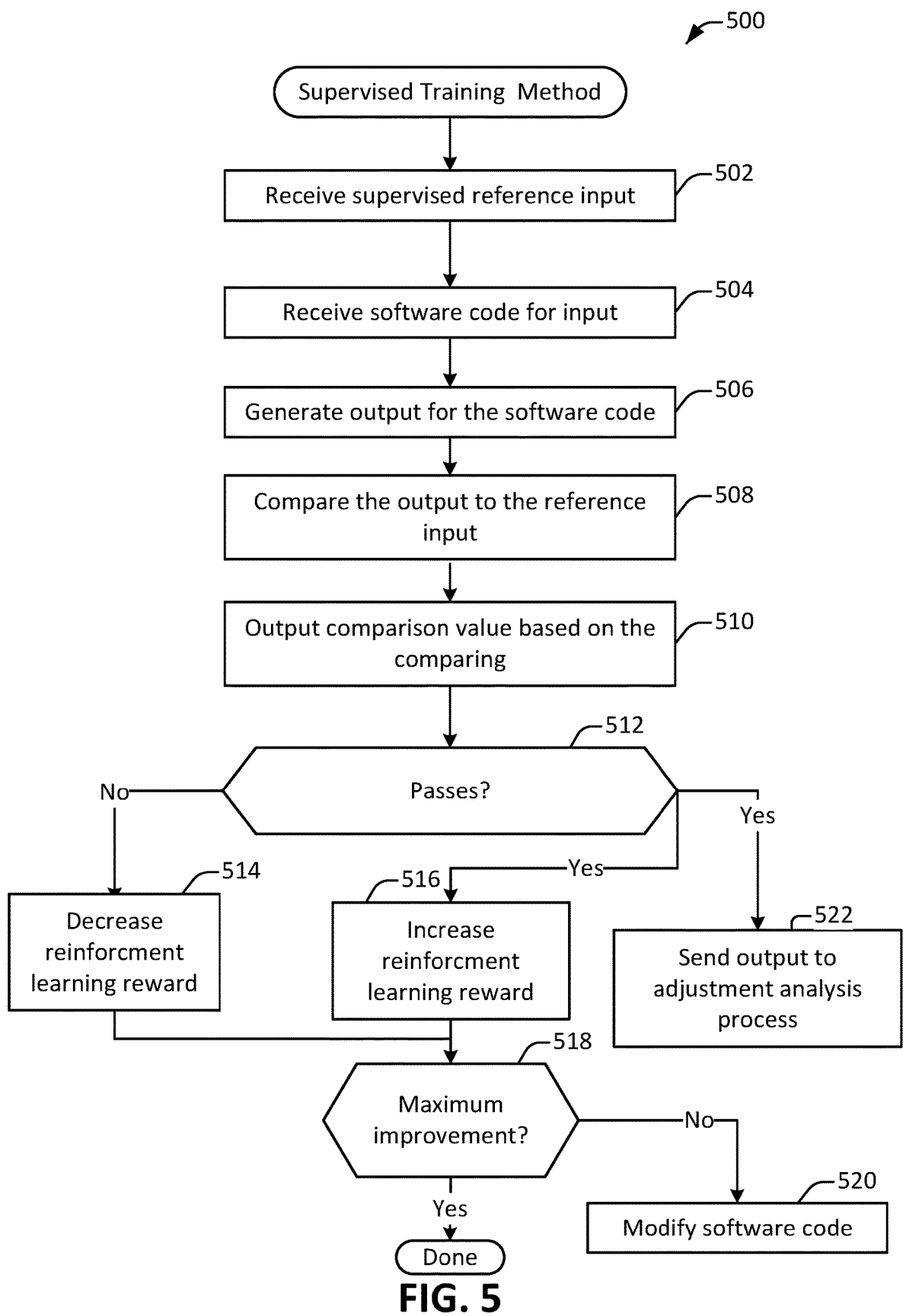
FIG. 5 depicts a simplified flow chart of a method for performing supervised training according to some embodiments.

FIG. 5 depicts a simplified flow chart 500 of a method for performing supervised training according to some embodiments. Different supervised training methods may be used and machine learning model 402 may be trained using the following training method or another method. The supervised machine learning process may receive the output from artifact analysis process 108. At 502, a training process receives a supervised reference input 415. A supervised reference input 415 may be a known output that is correct. For example, a supervised reference input may be input for a three-dimensional video animation, such as a reference animated character. In the case of getting a robot to dance like a princess, an example of a labeled dataset could be a snippet of a movie scene of the desired dance performance.

The training process becomes supervised due to providing the specific end state the process is expected to achieve. This is different from unsupervised machine learning that involves training model 402 on an unlabeled dataset, where the correct outputs are not provided. Model 402 may identify patterns or relationships in the data without knowing the correct outputs.

At 504, the supervised training process receives training input for the training process, such as software code. In some embodiments, the software code may be code that is used to animate the video. The software code may include settings, parameters, or other information that is used to animate the video.

At 506, the supervised training process generates output for the software code. For example, the software code may be input into a data model. A model creator may use the data model to create a visualization of the software code, which may be an animated character.

Then, at 508, the supervised training process may compare the output to the reference input. For example, the comparison process may compare the outputted animated character with the reference animated character. The comparison may be performed in different ways. For example, a spatial-temporal analysis may compare the two animated characters in the video. In some examples, a geometric analysis of the geometry of the animated character and kinematic analysis of the movement may be used. The output of the analysis may be a set of descriptors, such as histograms of the speed of different points of the animated character. The values of the reference animated character and the outputted animated character may be compared. Then, at 510, a comparison value may be output based on the comparisons of the reference input and the generated output. In some embodiments, the comparison value may measure a confusion matrix that may indicate the differences between the generated output and the reference input, but other comparison values may be appreciated.

At 512, the supervised training process determines if the generated output passes a validation. For example, the comparison value may be compared to a threshold. The threshold may indicate a tolerance for differences between the generated output and the reference input. Not passing the validation may indicate the generated output has more differences from the reference input than desired. Passing the validation indicates any differences between the generated output and the reference input are within a tolerance. For example, a confusion matrix may measure the differences between the generated animated character and the reference animated character. The confusion matrix value may be larger when there are less differences. Thus, when the confusion matrix values are smaller than a minimum threshold, the validation may fail.

The supervised training process may adjust machine learning model 402 based on the comparison in different ways. For example, at 514, the process may decrease a reinforcement learning reward if the comparison value fails validation. The decrease of the reward may lead to the adjustment of parameters in the machine learning model 402 to indicate the software code and generated output is not a good reflection of the reference input. At 516, if the comparison value passes validation, the supervised training process may increase the reinforcement learning reward. The increase of the reinforcement learning reward may cause the parameters of machine learning model 402 to be adjusted to reflect that the software code and the generated output are improvements moving towards the reference input and are becoming good representations for the reference input.

At 518, the supervised learning process determines if a maximum improvement has been achieved or a number of attempts is reached. The maximum improvement may be achieved when adjustments to the parameters become minimal or converge to a value. Also, a number of attempts may be set such that the training may be stopped after a certain number of times. If the maximum improvement has not been met, at 520, the software code that was input may be modified and the training process may be run again with the generated output from the modified software code. For example, the supervised training process may adjust some parameters or values in the software code.

At 522, the output may also be sent to adjustment analysis process 112. For example, the input, the comparison value, and the threshold may be sent to adjustment analysis process 112. Adjustment analysis process 112 may use the output to improve the adjustments. For example, the output generated from the training process may produce output data containing different attributes, as opposed to just one distinct reward value, such as the case when model 402 outputs a reward value linked to a confusion matrix. Adjustment analysis process 112 may sort/prioritize recommended adjustments by select model output attribute values, not just sorting/prioritizing recommended adjustments by a distinct reward value. Recommended adjustments then, could be organized by different queues, a queue could be associated with a distinct label, such as a group of similar adjustments to try next, where each group contains a self organizing priority queue. Adjustment analysis process 112 may try Priority-queue-A first because processing these adjustments could be much faster than priority-queue-B even though the adjustments in priority-queue-B may contain a higher reward value but will also require significantly more time.

Unsupervised Training

Figure 6:
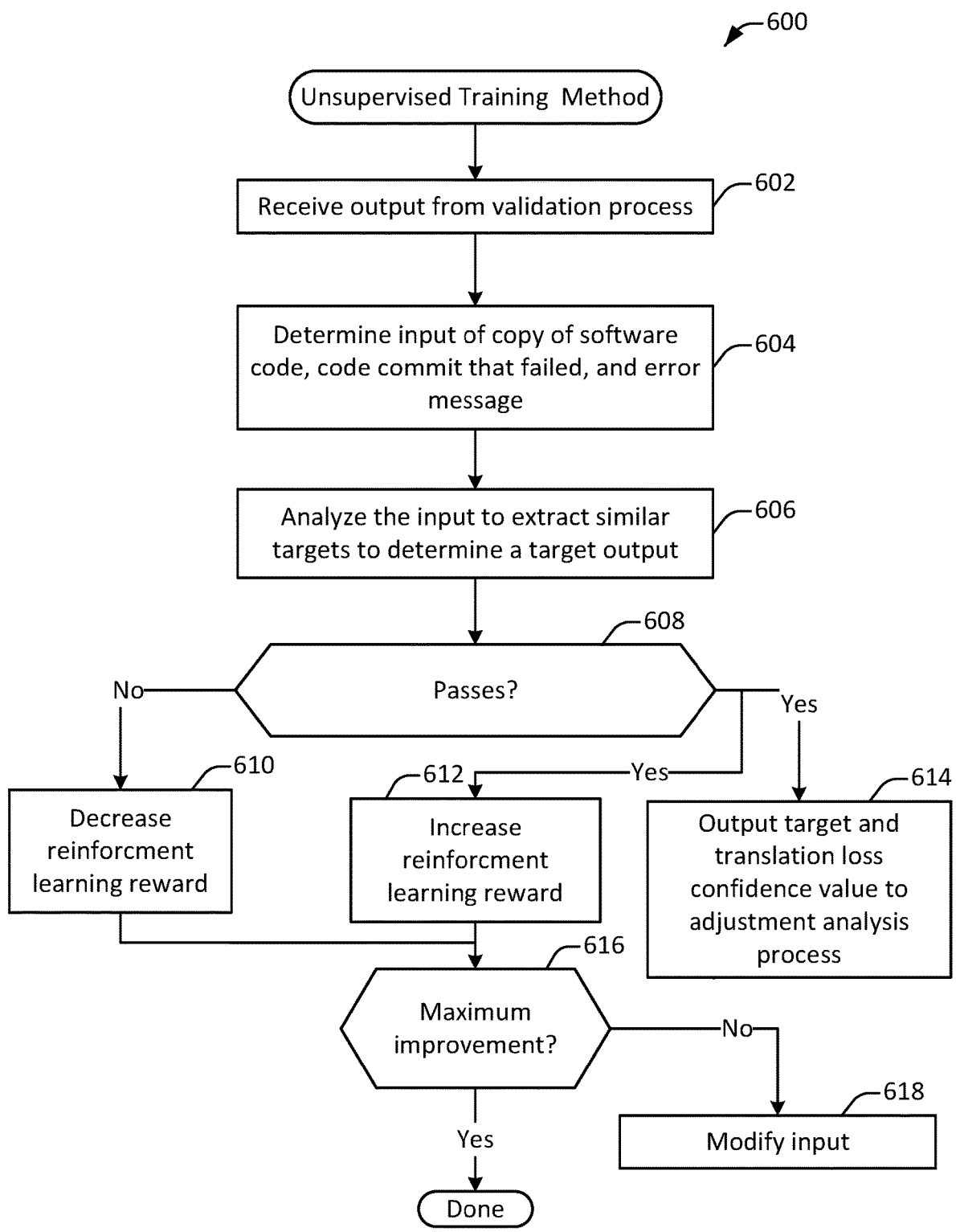
FIG. 6 depicts an unsupervised training method according to some embodiments.

FIG. 6 depicts an unsupervised training method according to some embodiments. Different unsupervised training methods may be used and machine learning model 402 may be trained using the following training method or another method. At 602, the unsupervised training process receives output from the validation process 106. At 604, the unsupervised training process determines an input of a copy of the software code, the submitted file that failed, and the error message. The copy of the software code may be the software code being developed or a portion of the software code being developed. The submitted file that failed may be a changed file that was submitted to repository 104. The error message may be the error message that is received from the validation.

At 606, the unsupervised training method analyzes the input to extract similar targets. The unsupervised training process may search a source language space based on a source sentence, which may be based on the error message. For example, the unsupervised training process may use the error message to search for similar error messages through the entirety of a space, such as the source code management system. The unsupervised training process may extract the top K closest matching sentences. The top K similar sentences may then be edited with permutations derived from the error message. The extracted sentences serve as pivotal points in the target space to locate a probable region where a target sentence could be located. The target sentence may be a real error message that is the ideal message that can be used to correct the error in the source code. For example, the real error message may include a solution that is used to correct the error.

The unsupervised training process may introduce a comparative translation loss to evaluate the target sentence to train machine learning model 402. The comparative translation loss encourages the target sentence to approximate the error message by maximizing the relative similarity with the source sentence compared to the extracted and edited sentences. Accordingly, the translation model, which may translate a line of bad code to a line of correct code, is attempting to minimize the relative distances of the translated sentence to the source sentence compared to the top K extracted sentences and edited sentences in the space. The top K extracted and edited sentences may be anchor points to locate a probable region in the space that improves the source to target sentence mapping.

The unsupervised training process outputs a target sentence with the least loss, which may be the least distance from the source sentence. At 608, the unsupervised training process determines if the target sentence passes validation. For example, the loss may be compared to a threshold. If the loss does not meet the threshold, such as is below the threshold, the target sentence may fail. If the loss meets the threshold, such as is above the threshold, then the target sentence may pass. The unsupervised training process may adjust parameters in machine learning model 402 based on the comparison in different ways. For example, at 610, the process may decrease a reinforcement learning reward if the comparison value fails. The decrease of the reward may lead to the adjustment of parameters in machine learning model to indicate the software code and generated output is not a good reflection of the reference input. At 612, if the comparison value passes, the unsupervised training process may increase the reinforcement learning reward. The increase of the reinforcement learning reward may cause the parameters of machine learning model 402 to be adjusted to reflect the software code and the generated output are good representations for the reference input. Also, at 614, if the target sentence passes, the unsupervised training process outputs the target and translation loss confidence value to adjustment analysis process 112. Adjustment analysis process 112 may use the information similarly in processing adjustments as described above in the supervised training example at 522 in FIG. 5. For example, adjustment analysis process 112 may use the targets and translation loss in determining target sentences for source sentences. Adjustment analysis process 112 may sort/prioritize target sentences by translation loss, not just sorting/prioritizing recommended adjustments by a distinct reward value. Target sentences then, could be selected based on translation loss or other factors in addition to using reward value.

At 616, the unsupervised learning process determines if a maximum improvement has been achieved or a number of attempts is reached. The maximum improvement may be achieved when adjustments to the parameters become minimal or converge to a value. Also, a number of attempts may be set such that the training may be stopped after a certain number of attempts. If the maximum improvement has not been met, at 618, the input may be modified and the training process may be run again with the generated output from the modified input. For example, the unsupervised training process may adjust some parameters or values in the software code.

CONCLUSION

Accordingly, the system may automatically determine and recommend adjustments to files that have been uploaded to repository 104. The adjustments are rated based on a confidence value such that the highest ranked adjustment may be selected. The above may reduce the manual hours that are needed to adjust software code. Additionally, better adjustments may be selected because the knowledge of prior adjustments that work may be leveraged. This may be better than a user manually determining what changes to make, which may require multiple small changes. The system may recommend the adjustment that may be most likely to provide the best result.

System

Figure 7:
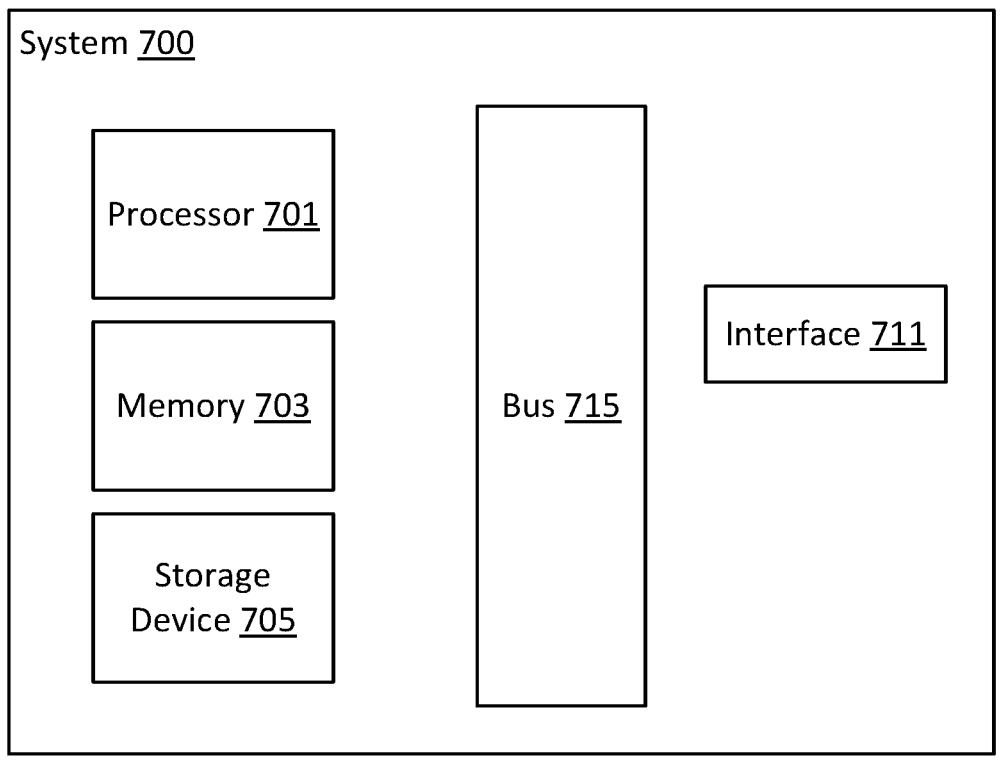
FIG. 7 illustrates one example of a computing device according to some embodiments.

FIG. 7 illustrates one example of a computing device according to some embodiments. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as integration system 102, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a," "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving, by a computing device, a change to data stored in a repository, wherein an artifact entity is generated based on the change to the data and the artifact entity failed a validation of an operation of the artifact entity when executed, and wherein the artifact entity failed the validation based on movement of the artifact entity when executed;
   analyzing, by the computing device, the change to the data via a model to generate a set of adjustments to the change to the data, wherein the model comprises a machine learning model, and the machine learning model is trained to output the set of adjustments based on a training process that adjusts parameters of the machine learning model based on changes to data;
   generating, by the computing device, a set of adjusted artifact entities based on the set of adjustments being applied to the change to the data, wherein the set of adjusted artifact entities operate different from the artifact entity;
   determining, by the computing device, an adjusted artifact entity in the set of adjusted artifact entities that is associated with an adjustment in the set of adjustments that passes the validation of the operation of the adjusted artifact entity; and
   outputting, by the computing device, the adjusted artifact entity as a validated artifact entity.

2. The method of claim 1, further comprising:
   determining a set of confidence values, wherein a confidence value is associated with a respective adjustment in the set of adjustments.

3. The method of claim 2, wherein a confidence value rates a confidence a respective adjustment generates an adjusted artifact entity that will pass the validation.

4. The method of claim 1, wherein receiving the change to the data comprises:
   receiving an original state of the data before the change to the data; and
   receiving the change to the data, wherein the original state and the change to the data is input into the model.

5. The method of claim 1, wherein an adjustment in the set of adjustments comprises a change in a value of the data.

6. The method of claim 1, wherein the adjustments in the set of adjustments are different than the change to the data.

7. The method of claim 1, wherein determining the adjusted artifact entity comprises:
   selecting a highest ranked adjustment in the set of adjustments that passes validation.

8. The method of claim 7, wherein:
   the model outputs confidence values for adjustments in the set of adjustments, and
   the highest ranked adjustment has a highest ranked confidence value that passes validation.

9. The method of claim 1, wherein outputting the adjusted artifact entity comprises:
   storing information for the adjusted artifact entity in artifact storage, wherein the artifact storage stores information for artifact entities that are generated from the data in the repository.

10. The method of claim 9, wherein:
    the information for the adjusted artifact entity is stored with metadata that indicates the adjusted artifact entity is generated based on the model, and
    information for another artifact entity is stored in the repository based on another change to the data, the another artifact entity passing validation without any adjustments.

11. The method of claim 1, wherein outputting the adjusted artifact entity comprises:
    storing information for the adjusted artifact entity in training storage; and
    using the information for the adjusted artifact entity to train the model.

12. The method of claim 11, further comprising:
    receiving a verification that the adjusted artifact entity should be used in training.

13. The method of claim 1, wherein the model is trained by:
    receiving a reference input;
    receiving input data;
    generating an output for the input data;
    comparing the reference input to the output; and
    adjusting a parameter in the model based on the comparing.

14. The method of claim 1, wherein the model is trained by:
    receiving data and an error message;
    analyzing a space to determine a similar target to the error message;
    comparing the similar target to the error message; and
    adjusting a parameter in the model based on the comparing.

15. A non-transitory computer-readable storage medium having stored thereon computer executable instructions, which when executed by a computing device, cause the computing device to be operable for:
    receiving a change to data stored in a repository, wherein an artifact entity is generated based on the change to the data and the artifact entity failed a validation of an operation of the artifact entity when executed, and wherein the artifact entity failed the validation based on movement of the artifact entity when executed;

analyzing the change to the data via a model to generate a set of adjustments to the change to the data, wherein the model comprises a machine learning model, and the machine learning model is trained to output the set of adjustments based on a training process that adjusts parameters of the machine learning model based on changes to data;

generating a set of adjusted artifact entities based on the set of adjustments being applied to the change to the data, wherein the set of adjusted artifact entities operate different from the artifact entity;

determining an adjusted artifact entity in the set of adjusted artifact entities that is associated with an adjustment in the set of adjustments that passes the validation of the operation of the adjusted artifact entity; and outputting the adjusted artifact entity as a validated artifact entity.

16. The non-transitory computer-readable storage medium of claim 15, further operable for:

determining a set of confidence values, wherein a confidence value is associated with a respective adjustment in the set of adjustments.

17. The non-transitory computer-readable storage medium of claim 15, wherein the adjustments in the set of adjustments are different than the change to the data.

18. An apparatus comprising:

one or more computer processors; and a computer-readable storage medium comprising instructions for controlling the one or more computer processors to be operable for:

receiving a change to data stored in a repository, wherein an artifact entity is generated based on the change to the data and the artifact entity failed a validation of an operation of the artifact entity when executed, and wherein the artifact entity failed the validation based on movement of the artifact entity when executed;

analyzing the change to the data via a model to generate a set of adjustments to the change to the data, wherein the model comprises a machine learning model, and the machine learning model is trained to output the set of adjustments based on a training process that adjusts parameters of the machine learning model based on changes to data;

generating a set of adjusted artifact entities based on the set of adjustments being applied to the change to the data, wherein the set of adjusted artifact entities operate different from the artifact entity;

determining an adjusted artifact entity in the set of adjusted artifact entities that is associated with an adjustment in the set of adjustments that passes the validation of the operation of the adjusted artifact entity; and outputting the adjusted artifact entity as a validated artifact entity.

19. A method comprising:

receiving a change to data stored in a repository wherein an artifact entity is generated based on the change to the data and the artifact entity failed a validation of an operation of the artifact entity when executed, and wherein the artifact entity failed the validation of an appearance of the artifact entity when executed;

analyzing the change to the data via a model to generate a set of adjustments to the change to the data, wherein the model comprises a machine learning model, and the machine learning model is trained to output the set of adjustments based on a training process that adjusts parameters of the machine learning model based on changes to data;

generating a set of adjusted artifact entities based on the set of adjustments being from the change to the data, wherein the set of adjusted artifact entities operate different from the artifact entity;

determining an adjusted artifact entity in the set of adjusted artifact entities that is associated with an adjustment in the set of adjustments that passes the validation of the operation of the adjusted artifact entity; and outputting the adjusted artifact entity as a validated artifact entity.

\* \* \* \* \*

UNITED STATES PATENT AND TRADEMARK OFFICE
CERTIFICATE OF CORRECTION

PATENT NO. : 12,299,420 B2
APPLICATION NO. : 18/177752
DATED : May 13, 2025
INVENTOR(S) : Jason Alexander Cox et al.

It is certified that error appears in the above-identified patent and that said Letters Patent is hereby corrected as shown below:

In the Claims

In Claim 19, Column 16, Line 33, after "being" delete "from" insert --applied to--

Signed and Sealed this
Twenty-second Day of July, 2025

Coke Morgan Stewart
*Acting Director of the United States Patent and Trademark Office*